July 3, 1956 H. H. ROGNEBY 2,752,890
PNEUMATIC ACTUATOR WITH AUTOMATIC PRESSURE UNLOADING DEVICE
Filed Jan. 27, 1955 2 Sheets-Sheet 1
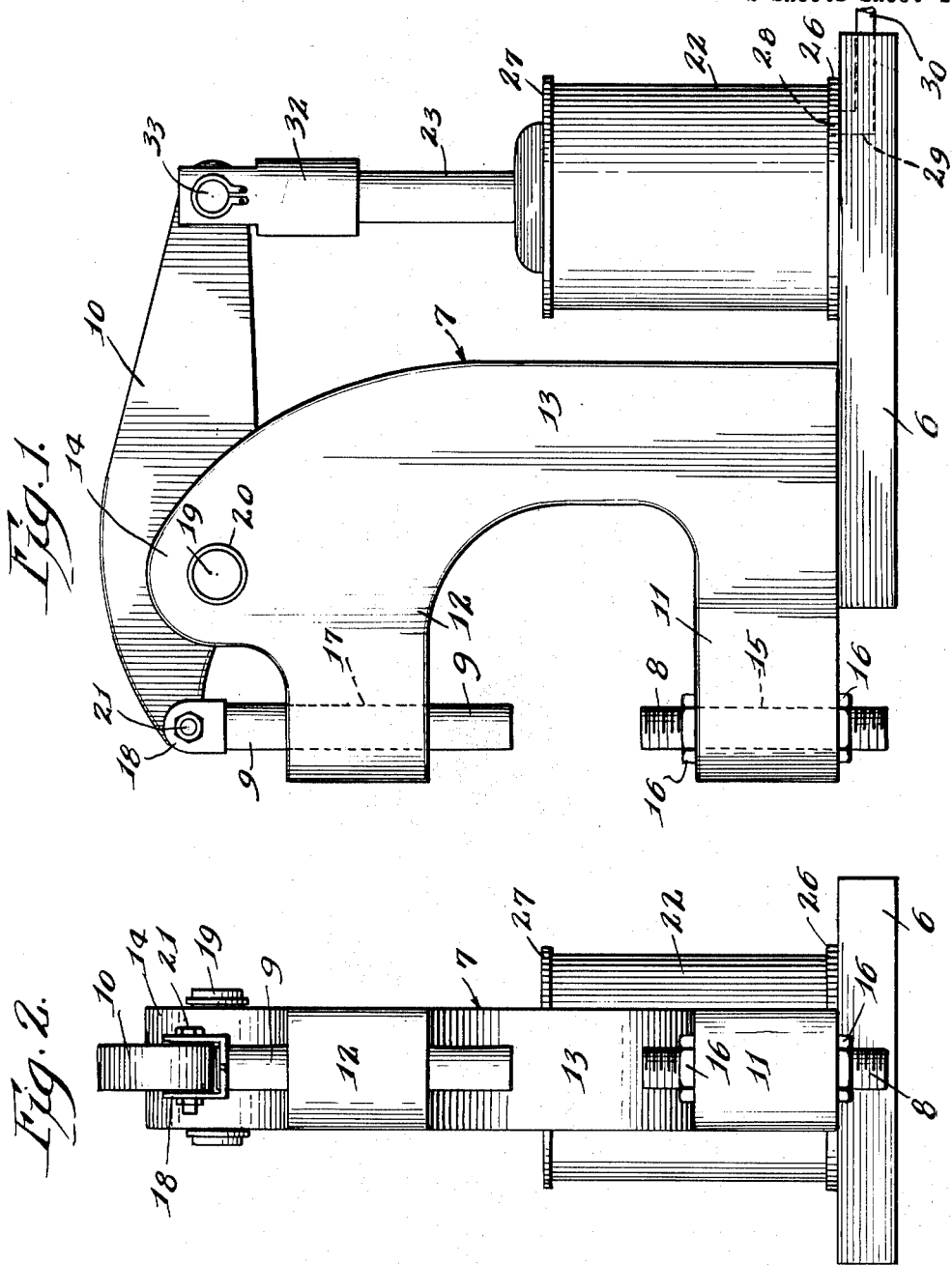
Inventor.
Hawkin H. Rogneby.
By. Fred Heflack
Attorney.

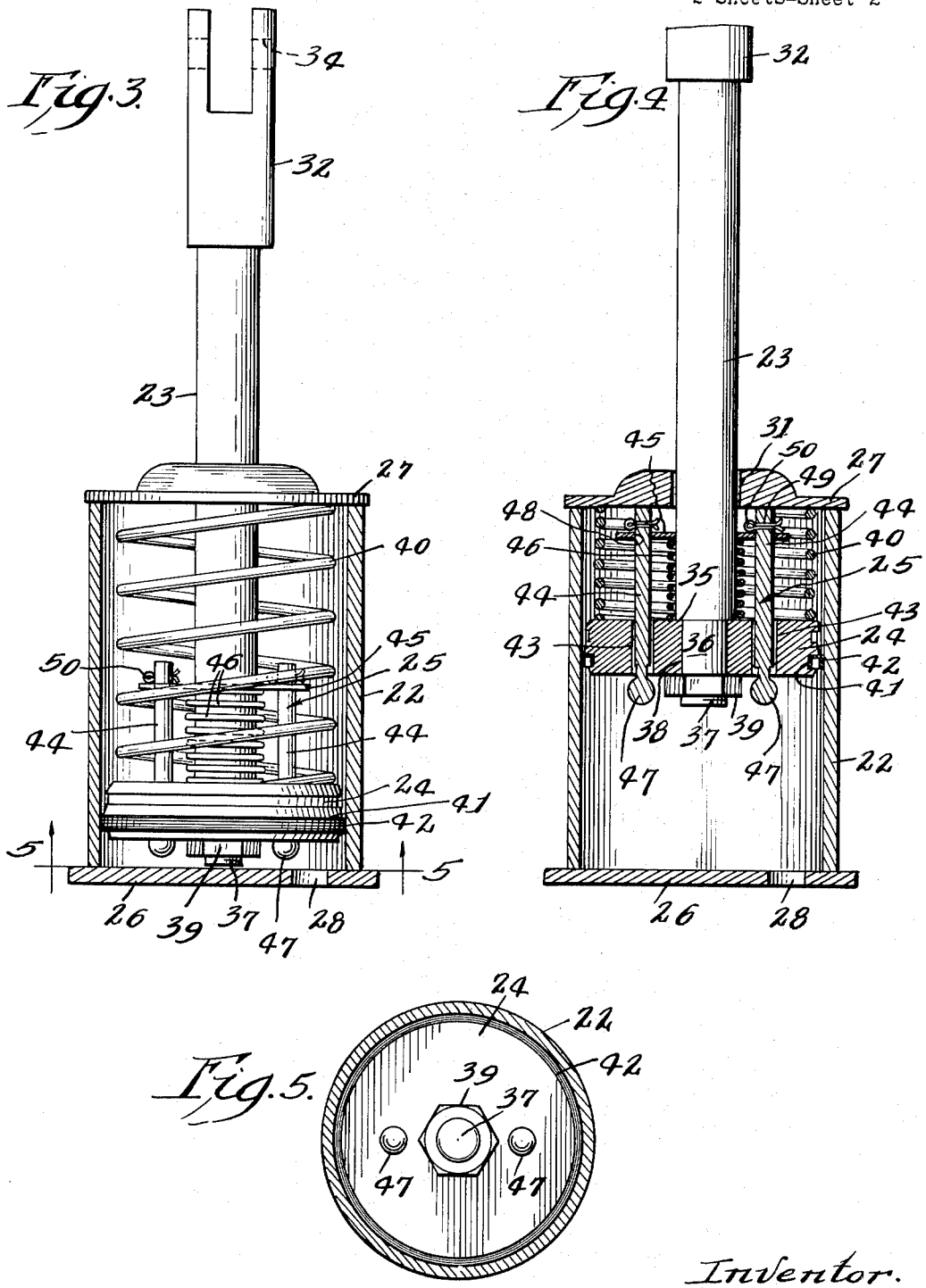

United States Patent Office 2,752,890
Patented July 3, 1956

2,752,890

PNEUMATIC ACTUATOR WITH AUTOMATIC PRESSURE UNLOADING DEVICE

Hawkin H. Rogneby, Chicago, Ill., assignor to Power Brake Parts Mfg. Co., Chicago, Ill., a corporation of Illinois Application January 27, 1955, Serial No. 484,463

2 Claims. (Cl. 121—38)

The present invention relates generally to actuators. More particularly, the invention relates to that type of actuator which is operated by air under pressure, serves as a medium or instrumentality for effecting back and forth shift of a movable part of a machine, such, for example, as a riveter, and as its principal components or parts comprises: (1) a cylinder which is provided at its ends with fixed heads, embodies at one end thereof valve-controlled means for supplying it with air under comparatively high pressure, and has its other end vented to atmosphere; (2) a piston rod which extends slidably through a hole in the central portion of the head at said other end of the cylinder and has its outer end operatively connected to the movable part of the machine to which the actuator is applied; (3) a piston which is mounted in the cylinder to slide back and forth between the two heads, has its central portion connected fixedly to the inner end of the piston rod, and is adapted when air under pressure is introduced into said one end of the cylinder to slide towards the head at the other end of the cylinder and cause the piston rod to slide outwards and impart a power stroke to the movable part of the machine; and (4) a spiral compression spring which extends around the inner end portion of the piston rod and between the piston and the head at said other end of the cylinder and serves when said one end of the cylinder is vented to atmosphere by way of the valve to retract the piston and piston rod and also the movable part of the machine.

One object of the invention is to provide a pneumatic actuator which is an improvement upon, and has certain inherent advantages over, previously designed actuators of the same general type and is characterized by the fact that it embodies a simple and novel pressure unloading device whereby, when the piston reaches the end of its power imparting stroke while the valve is still in its air supplying position, the one end of the cylinder, i. e., the end of the cylinder to which air under comparatively high pressure is supplied, is immediately and automatically vented to atmosphere to the end that the air in said one end of the cylinder cannot build up to a dangerous or injurious degree.

Another object of the invention is to provide a pneumatic actuator of the type and character under consideration in which the piston has a plurality of spaced apart holes therethrough and the automatic pressure unloading device comprises a plurality of rods which correspond in number to the holes in the piston, are disposed in parallel relation with the piston rod, extend loosely and slidably through the holes, have valve members on the ends thereof that extend towards the one end of the cylinder, embody spring means whereby they are urged in the direction of their other ends so as to cause the valve members normally to seat against the adjacent ends of the holes in the piston, and are of such length that directly before the piston reaches the end of its power imparting stroke, their said other ends are brought into abutment with the head at said other end of the cylinder with the result that completion of the power imparting stroke of the piston effects unseating of the valve members and thus establishes communication of the one end of the cylinder with the vented other end of the cylinder.

Another object of the invention is to provide a pneumatic actuator of the last mentioned character in which the valve members on the ends of the rod that extend towards the one end of the cylinder are in the form of integral spherical heads of slightly greater diameter than the diameter of the holes in the piston.

A further object of the invention is to provide a pneumatic actuator of the type and character under consideration in which the spring means for urging the rods in the direction of their other ends is in the form of a spiral compression spring which extends around the inner end portion of the piston rod and has one end thereof in abutment with the piston and its other end in abutment with a ring shaped plate which extends around, and is slidable with respect to, the inner end portion of the piston rod and has its outer marginal portion operatively connected to said other ends of the rods.

A still further object of the invention is to provide a pneumatic actuator which effectively and efficiently fulfills its intended purpose, involves a novel arrangement of parts, and is capable of being produced at a comparatively low cost.

Other objects of the invention and the various advantages and characteristics of the present pneumatic actuator will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of a riveter having applied thereto a pneumatic actuator embodying the invention;

Figure 2 is a front view of the riveter;

Figure 3 is a view showing the cylinder of the actuator in section and the other parts of the actuator in elevation and also showing the piston in its spring retracted position;

Figure 4 is a longitudinal section of the pneumatic actuator showing the piston at the end of its power imparting stroke and the valve members on the rods of the automatic pressure unloader in their open or unseated position wherein they cause communication of the one end of the cylinder with the vented end of the cylinder via the holes in the piston; and Figure 5 is a transverse section on the line 5—5 of Figure 3.

The pneumatic actuator that is shown in the drawings constitutes the preferred form or embodiment of the invention. It is essentially a self-contained unit and is illustrated in connection with a standard or conventional riveter. The latter represents one type of machine with which the actuator may be used, and comprises a horizontally extending bed plate 6, an upstanding C-shaped frame 7, an anvil 8, a plunger 9 and a rocker arm 10. The bed plate 6 is adapted to be bolted or otherwise fixedly secured to a platform (not shown) on the upper portion of a supporting structure (also not shown) and is illustrated in the drawings as being rectangular. The upstanding C-shaped frame 7 of the riveter rests on, and extends upwards from, one end portion of the bed plate 6 and consists of a horizontally extending lower arm 11, a horizontally extending upper arm 12 and a vertically extending intermediate arm 13. It is in the form of a one-piece forging and embodies on the inner end portion of its upper arm 12 a pair of integral laterally spaced upstanding ears 14. The anvil 8 of the riveter is in the form of a vertically extending screw threaded rod the central portion of which extends through a vertical bore 15 in the outer end portion of the lower arm 11 of the frame 7. The end portions of the rod that constitutes the anvil 8 are provided with nuts 16 for adjustably securing the anvil in place. The plunger 9 of the riveter extends vertically and is mounted for vertical sliding movement in a vertical bore 17 in the outer end of the upper frame arm 12. It is in longitudinal alignment with the anvil 8 and is adapted when slid downwards towards the upper end of the anvil to effect a riveting operation. The upper end of the plunger 9 is provided with an integral bifurcation 18 which is located outwards of the ears 14. The rocker arm 10 extends substantnally horizontally and is located for the most part above the frame 7. The central portion of the rocker arm fits loosely between the ears 14 and is pivotally connected thereto by way of a horizontal pivot pin 19 the ends of which fit within bushing-lined holes 20 in the ears 14 and the central portion of which fits snugly within a hole (not shown) in the rocker arm. The left hand end of the rocker arm 10 as viewed in Figure 1 fits between the furcations of the bifurcation 18 and is pivotally connected thereto by a horizontally extending bolt 21. When the rocker arm is rocked in a counterclockwise direction as viewed in Figure 1, it serves to slide the plunger 9 downwards towards the anvil 8 and when the rocker arm is reversely rocked it operates to retract or slide upwards the plunger.

The pneumatic actuator serves as a medium or instrumentality for rocking back and forth the rocker arm 10 of the riveter and as its principal components or parts comprises a cylinder 22, a piston rod 23, a piston 24, and a pressure unloading device 25. Except for the pressure unloading device the actuator is conventional.

The cylinder 22 of the pneumatic actuator extends vertically and is located directly behind the C-shaped frame 7 of the riveter. It is suitably connected to the subjacent portion of the bed plate 6 and has a lower head 26 and an upper head 27. The two heads are fixedly connected to the ends of the cylinder in any suitable or desired manner. The lower head 26 rests on the bed plate 6 and is provided on its outer portion with a hole 28 for admitting air under comparatively high pressure into the lower end of the cylinder 22. The hole 28 is in registry and communication with one end of an L-shaped duct 29 in the bed plate 6. It is contemplated that the other end of the duct will be connected to a source of air under pressure by way of a flexible hose 30 which includes a two-way control valve (not shown). If desired, the control valve may be like that which is disclosed in, and forms the subject matter of, United States Patent No. 2,681,076, dated June 15, 1954. When the valve is in its open position, air under pressure flows into the lower end of the cylinder 22 via the duct 29 and the hole 28 and when the valve is in its closed position the supply of air under pressure from the source is cut off and the lower end of the cylinder is vented to atmosphere. The upper head 27 has a thickened central portion in which is formed a circular hole 31.

The piston rod 23 of the pneumatic actuator is vertically positioned and extends loosely but slidably through the hole 31 in the central portion of the upper head 27. The upper end of the piston rod is provided with a fixedly mounted bifurcation 32, the furcations of which are arranged in straddled relation with the rear or right-hand end of the rocker arm 10 and are pivotally connected thereto by way of a horizontal pivot pin 33. The ends of the pivot pin 33 extend through horizontally aligned holes 34 in the furcations of the bifurcation 32 and the central portion of the pivot pin extends through a hole in the rear end of the rocker arm 10. The lower end of the piston rod 23 has an annular downwardly facing shoulder 35 and is provided with an integral reduced stem 36. As shown in Figures 3 and 4 of the drawings, the lower end of the stem 36 is provided with a screw thread 37, and the diameter of the hole 31 in the central portion of the upper head 27 is greater than the diameter of the piston rod and hence the upper end of the cylinder 22 is vented to atmosphere.

The piston 24 of the actuator is mounted in the cylinder 22 for up and down sliding movement and has in the central portion thereof a circular hole 38 in which fits the reduced stem 36 on the lower end of the piston rod 23. A nut 39 is mounted on the screw thread 37 and serves to clamp the central portion of the piston against the annular downwardly facing shoulder 35 and thus fixedly connects the piston to the piston rod. When air under pressure is introduced into the lower end of the cylinder the piston 24 is caused to slide upwards towards the upper head 27. In connection with upward sliding movement of the piston, the piston rod is caused to slide upwards and rock the rocker arm 10 so that the latter imparts downward sliding movement to the plunger towards the upper end of the anvil 8. A spiral compression spring 40 serves to retract the piston 24 together with the piston rod 23 when the aforementioned valve is turned into its closed position wherein it shuts off the supply of air under pressure to the cylinder and results in venting of the lower end of the cylinder. Such spring extends around the lower end portion of the piston rod and has the lower end thereof in abutment with the outer marginal portion of the piston. The upper end of the spring abuts against the outer marginal portion of the inner surface of the upper head 27. The outer peripheral portion of the piston is provided with an annular groove 41 in which a packing ring 42 is mounted. The piston is provided midway between its outer and inner peripheral portions with two vertically extending open ended holes 43. The latter are preferably arranged diametrically opposite one another and are of circular and uniform cross section from end to end.

The pressure unloading device 25 operates automatically to release the air under pressure in the lower end of the cylinder 22 when the piston reaches the end of its up or power imparting stroke. By releasing the air under pressure in the lower end of the cylinder at the time the piston reaches the end of its power imparting stroke, there is no possibility of the air in the lower end of the cylinder building up to a dangerous or injurious pressure while the aforementioned valve in the flexible hose 30 is retained by the operator in its open position. As its components or parts, the pressure unloading device 25 comprises a pair of vertically extending rods 44, a ring shaped plate 45 and a spiral compression spring 46. The rods 44 are, respectively, associated with the holes 43 in the piston 24 and are in spaced and parallel relation with the lower or inner end of the piston rod 23. The lower end portions of the rods extend loosely and slidably through the holes 43 as best shown in Figure 4 and are provided at their extremities with integral spherical heads 47. The latter are of slightly greater diameter than the holes 43 and function as valve members which normally seat against the lower ends of the holes and cut off communication between the lower and upper ends of the cylinder by way of the holes. When the rods as hereinafter described are slid downwards relatively to the piston, the spherical heads 47 are moved out of seated relation with the lower ends of the holes 43 with the result that such holes establish communication between the lower and upper ends of the cylinder. The two rods are of such length that the upper ends thereof are disposed an appreciable distance above the piston 24. The ring shaped plate 45 and the spiral compression spring 46 serve to urge the rods 44 upwards with respect to the piston and thus cause the spherical heads normally to remain in their seated position with respect to the lower ends of the holes 43. The plate 44 extends loosely around, and is slidable with respect to, the lower central portion of the piston rod 23. It is disposed an appreciable distance above the piston 24 and has in its outer marginal portion a pair of diametrically opposite holes 48 through which the upper ends of the rods 44 extend. The upper extremities of the rods are provided with transversely extending holes 49 through which cotter pins 50 extend. Such pins serve as abutments for limiting upward sliding movement of the ring shaped plate 45 relatively to the upper ends of the rods 44. The spiral compression spring 46 extends around the lower end portion of the piston rod and is disposed inwards of the rods 44. The lower end of the spring 46 abuts against the central portion of the piston 43 and the upper end of the spring abuts against the inner marginal portion of the plate 45. Normally the spring 46 and the ring shaped plate 45 maintain the spherical heads 47 in seated relation with the lower ends of the holes 43 in the piston 24. The rods 44 are of such length that directly before the piston reaches the end of its up or power imparting stroke, the upper ends of the rods are brought into abutment with the upper head 27. In connection with completion of the power imparting stroke of the piston, there is such relative sliding movement of the piston with respect to the rods that the spherical heads 47 on the lower ends of the rods become unseated with respect to the holes 43 and thus the air under pressure in the lower end of the cylinder is vented to atmosphere via the holes 43, the upper end of the cylinder, and the hole 31 in the central portion of the upper head 27. As soon as the piston starts its retractile stroke in response to the action of the spiral compression spring 40 after closing of the aforementioned valve in the flexible hose 30, the spiral compression spring 46 and the ring shaped plate 45 operate to slide the rods 44 upward with respect to the piston and thus cause the spherical heads 47 to seat against the lower ends of the holes 43 and resultantly cut off communication between the lower and upper ends of the cylinder.

It is contemplated that in connection with operation of the pneumatic actuator, the operator will alternately open and close the aforementioned two-way valve in the flexible hose 30. As soon as the valve is opened air under comparatively high pressure enters the lower end of the cylinder 22 and causes the piston 24 to slide upwards against the force of the spiral compression spring 40. As the piston slides upwards the piston rod 23 operates through the medium of the rocker arm 10 to slide the plunger 9 downwards towards the upper end of the anvil 8. Directly before the piston reaches the end of its power imparting stroke the rods 44 are arrested as a result of the upper ends thereof being brought into abutment with the upper head 27. In connection with the final increment of upward movement of the piston, the spherical heads 47 as heretofore pointed out become unseated from the lower ends of the holes 43. As soon as the heads are in unseated relation with respect to the lower ends of the holes, the air under pressure in the lower end of the cylinder is vented to atmosphere as hereinbefore pointed out and hence even though the operator permits the aforementioned valve to remain in its open position the air in the lower end of the cylinder cannot build up to a dangerous or injurious degree. As soon as the operator closes the valve so as to cut off the supply of air under pressure to the lower end of the cylinder and vent the latter, the spiral compression spring 40 acts to retract the piston 24 and the piston rod 23. In connection with retraction of the piston rod, the rocker arm 10 is reversely rocked and effects retraction of the plunger 9. As soon as the piston starts its retractile movement, the spring 46 operates through the medium of the ring shaped plate 45 to slide the rods 44 upwards with respect to the piston in order again to bring the spherical heads 47 into seated relation with the lower ends of the holes 43 and thus cut off communication between the lower and upper ends of the cylinder.

The herein described pneumatic actuator is both safe and efficient because its includes the automatic pressure unloader 25. The latter is positive so far as its action or operation is concerned and eliminates any possibility of dangerous pressure being developed in the lower end of the cylinder in the event that the operator permits the control valve in the flexible hose 30 to remain in its open position. Due to the simplicity of design and construction of the automatic pressure unloader, the actuator as a whole may be manufactured at a comparatively low cost.

Although the actuator has been described in connection with a riveter, it is to be understood that the actuator has many other capabilities of use. It is to be understood that the unloader instead of comprising two rods 44 may embody a single rod or more than two rods. In addition, it is to be understood that the invention is not to be restricted to the specific details set forth since these may be changed or modified within the scope of the appended claims without departing from the spirit and scope of the invention.

Having thus described the invention what I claim as new and desire to secure by Letters Patent is:

1. In a pneumatic actuator of the type that comprises a cylinder having heads at its ends, embodying at one end thereof valve controlled means for supplying it with fluid under pressure, having its other end vented to atmosphere, and provided with a centrally disposed hole in the head thereof that is at its said other end, a piston rod extending slidably through the aforesaid hole, a piston mounted in the cylinder to slide back and forth between the two heads, connected fixedly to the inner end of the piston rod, having spaced apart open ended holes extending therethrough its outer marginal portion, and adapted when air under pressure is introduced into said one end of the cylinder to slide towards the hole-equipped head and cause the piston to slide outwards, and spring means disposed in the cylinder and operative to retract the piston and rod when the supply of air under pressure to said one end of the cylinder is cut off; a pressure unloading device operative automatically when the piston reaches the end of sliding movement towards said hole-equipped head to vent said one end of the cylinder to atmosphere and comprising rods of materially greater length than the piston, corresponding in number to the holes in the piston, disposed in parallel relation with the piston rod, extending loosely and slidably through said holes in the piston respectively, embodying valve members on the ends thereof that extend towards the head at said one end of the cylinder, and provided with spring means for urging them towards their other ends and causing the valve members normally to seat against the adjacent ends of and close the holes in the piston, said rods being of such length that directly before the piston reaches the end of sliding movement towards said hole-equipped head said other ends of the rods are brought into abutment with the hole-equipped head with the result that completion of said sliding movement of the piston towards the hole-equipped head effects unseating of the valve members and establishes communication of the two ends of the cylinder via the holes in the piston, said spring means for urging the rods of the unloading device being in the form of a ring-shaped plate extending loosely and slidably around the inner end portion of the piston rod, disposed between the piston and said hole-equipped head, and having its outer marginal portion operatively connected to said other ends of the rods, and a spiral compression spring extending around said inner end portion of the piston rod and having one end thereof abutting against the piston and its other end abutting against said ring-shaped plate.

2. In a pneumatic actuator of the type that comprises a cylinder having fixed heads at its ends, embodying at one end thereof valve controlled means for supplying it with air under comparatively high pressure, having its other end vented to atmosphere, and provided with a centrally disposed hole in the head thereof that is at its said other end, a piston rod extending slidably through the aforesaid hole, a piston mounted in the cylinder to slide back and forth between the two heads, connected fixedly to the inner end of the piston rod, having a pair of diametrically opposite open ended holes extending through its outer marginal portion, and adapted when air under pressure is introduced into said one end of the cylinder to slide towards the hole-equipped head and cause the piston to slide outwards, and spring means disposed in the cylinder and operative to retract the piston and rod when the supply of air under pressure to said one end of the cylinder is cut off; a pressure unloading device operative automatically when the piston reaches the end of sliding movement towards said hole-equipped head to vent said one end of the cylinder to atmosphere and comprising a pair of rods of materially greater length than the piston, disposed in parallel relation with the piston rod, extending loosely and slidably through said holes in the piston, embodying on the ends thereof that extend towards the head at said one end of the cylinder integral enlarged substantially spherical heads constituting valve members, and provided with spring means for urging them towards their other ends and causing the valve members normally to seat against the adjacent ends of and close the holes in the piston, said rods being of such length that directly before the piston reaches the end of sliding movement toward said hole-equipped head said other ends of the rods are brought into abutment with the hole-equipped head with the result that completion of said sliding movement of the piston towards the hole-equipped head effects unseating of the valve members and establishes communication of the ends of the cylinder via the holes in the piston, said spring means for urging the rods of the unloading device being in the form of a ring-shaped plate extending loosely and slidably around the inner end portion of the piston rod, disposed between the piston and said hole-equipped head, and having its outer marginal portion operatively connected to said other ends of the rods, and a spiral compression spring extending around said inner end portion of the piston rod and having one end thereof abutting against the piston and its other end abutting against said ring-shaped plate.

References Cited in the file of this patent

UNITED STATES PATENTS

| | | |
|---|---|---|
| 1,244,317 | Gaffney | Oct. 23, 1917 |
| 1,384,421 | Anderson | July 12, 1921 |
| 1,666,449 | Hinger | Apr. 17, 1928 |
| 1,880,627 | Wilson | Oct. 4, 1932 |